(12) United States Patent
Hauber et al.

(10) Patent No.: US 7,063,118 B2
(45) Date of Patent: Jun. 20, 2006

(54) COMPOSITE TAPE LAYING APPARATUS AND METHOD

(75) Inventors: David E. Hauber, Troy, NY (US); Rob J. Langone, Clifton Park, NY (US); James P. Martin, Troy, NY (US); Scott F. Miller, Albany, NY (US); Michael J. Pasanen, Troy, NY (US)

(73) Assignee: ADC Acquisition Company, Schenectady, NY (US)

( * ) Notice: Subject to any disclaimer, the term of this patent is extended or adjusted under 35 U.S.C. 154(b) by 92 days.

(21) Appl. No.: 10/717,022

(22) Filed: Nov. 20, 2003

(65) Prior Publication Data

US 2005/0109451 A1    May 26, 2005

(51) Int. Cl.
*B32B 37/00* (2006.01)

(52) U.S. Cl. ............... 156/486; 156/367; 156/468; 156/522; 156/570; 156/577; 156/265; 156/270

(58) Field of Classification Search ............... 156/574, 156/577, 247, 249, 256, 270, 353, 468, 486, 156/522, 523, 265, 367, 576
See application file for complete search history.

(56) References Cited

U.S. PATENT DOCUMENTS

| 4,382,836 A * | 5/1983 | Frank ..................... 156/459 |
| 4,591,402 A * | 5/1986 | Evans et al. ............ 156/350 |
| 2005/0016670 A1* | 1/2005 | Kanbara et al. ........ 156/257 |

* cited by examiner

*Primary Examiner*—Linda Gray
(74) *Attorney, Agent, or Firm*—John F. McDevitt

(57) ABSTRACT

A fully automated method and apparatus is disclosed to laminate various structural articles with a layer of resin impregnated fiber tape. The tape laying member removes a releasable backing layer from the tape being employed, then deposits the unbacked tape on the surface of the structural article, and finally severs the end of the tape being deposited. An automated cut and restart procedure is employed in the present tape laying member to increase tape throughput.

14 Claims, 4 Drawing Sheets

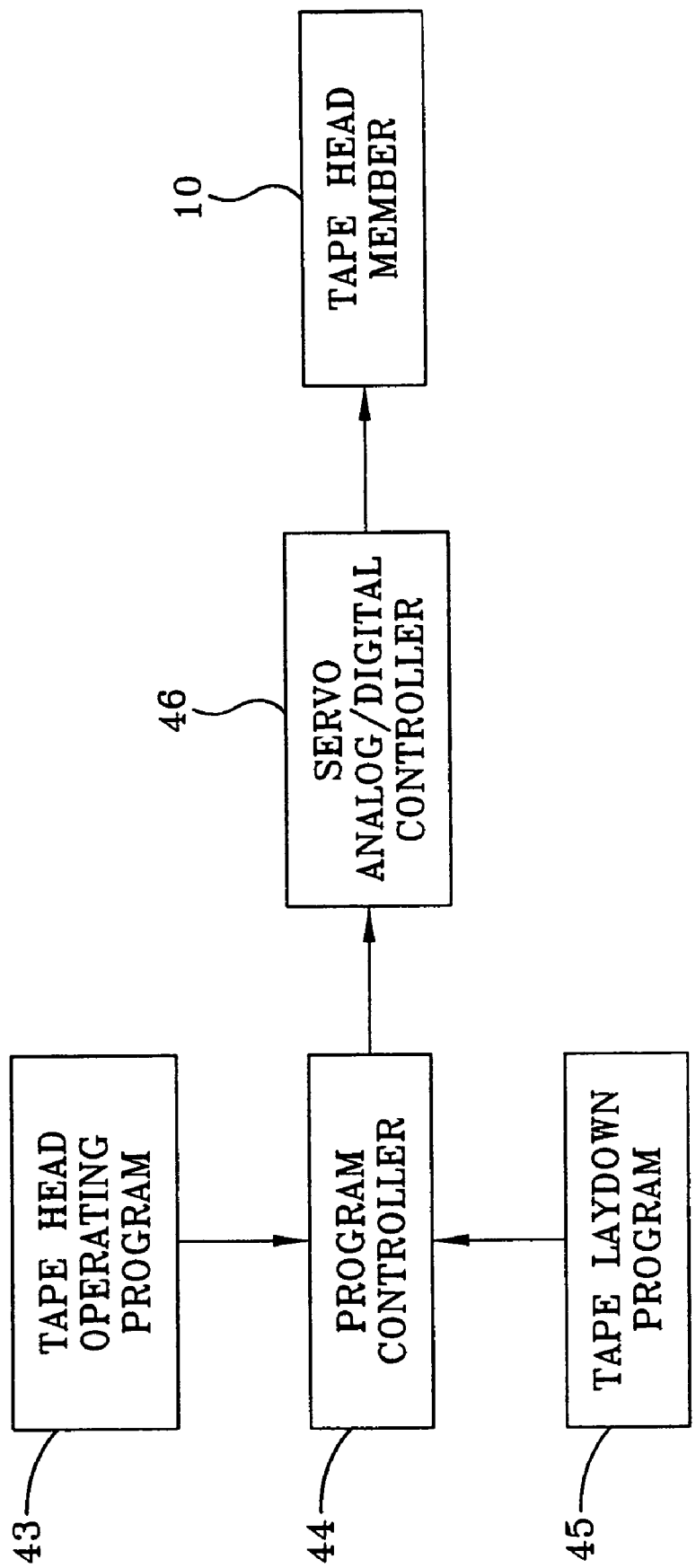

COMPOSITE TAPE LAYING APPARATUS AND METHOD

BACKGROUND OF THE INVENTION

This invention relates generally to an improved method and apparatus for continuously applying a composite fiber tape to form various laminated articles and, more particularly, to doing so with a resin prepreg tape in a more simple and effective manner.

Various apparatus and methods to apply or lay composite fiber tapes formed with continuous fibers preimpregnated with a resin binder are already well known. For example, there is described in U.S. Pat. No. 3,574,040 an apparatus for this purpose which automatedly peels the backing layer off this type composite tape before applying the unbacked tape to reinforce various aircraft and aerospace structural parts. There is also described in U.S. Pat. No. 4,557,783 a different automated apparatus for separating the backing layer from a thermoset resin prepreg tape and applying the unbacked tape with compaction while further storing said backing layer. In U.S. Pat. No. 4,591,402 there is further described a still different automated apparatus of this type having sensing devices for position control in said apparatus during operation and which further includes a disc cutter mechanism to sever the unbacked tape. The automated apparatus of this type described in U.S. Pat. No. 4,696,707 is said to enable programming of the tape head in said apparatus to minimize wrinkling of the tape edges when being applied.

The apparatus and methods now in use to automatedly laminate various structural shapes with multiple layers of continuous fibers preimpregnated with a resin binder are both complex and expensive. The prior art techniques for laydown of such tape to reinforce the underlying structural shape are observed to be relatively slow and require process interruption which understandably increases the cost of manufacture. Moreover, the size and complexity of the existing apparatus for tape laydown causes excessive downtime to be experienced during a continuous operation of such equipment. Minimizing or eliminating such observed disadvantages found with the existing apparatus and methods for tape laydown would thereby prove beneficial in reducing manufacturing costs for the resulting laminated article.

It is an important object of the present invention, therefore, to provide a novel apparatus to automatedly form a composite laminated structural shape having at least one deposited surface layer of continuous resin impregnated fiber.

It is still another important object of the present invention to provide a novel method to automatedly apply an adherent surface layer of continuous resin impregnated fiber to form a laminated article.

Still another important object of the present invention is to provide a tape laying apparatus for a thermoset type composite fiber prepreg enabling automated cut and restart operation.

A still further object of the present invention is to provide a novel method whereby multiple layers of a composite fiber prepreg can be adhesively secured to the surface of various articles in a continuous manner.

These and still further objects of the present invention will become more apparent upon considering the following more detailed description of the present invention.

SUMMARY OF THE INVENTION

It has now been discovered by the present applicants that a significantly simpler procedure enables satisfactory laydown of a fiber prepreg in a continuous automated manner. More particularly, the present apparatus employs a novel laterally moving head member for relatively high speed deposition of the fiber prepreg in order to laminate assorted aircraft, aerospace and industrial structures. In so doing, the present apparatus includes a novel cut and restart mechanism enabling the tape to be cut while still being fed after removal of the customary backing layer. Such manner of relatively continuous tape transport in the present apparatus maximizes material throughput during the reinforcement procedure for higher operating efficiency. The presently modified head member applies the unbacked reinforcement tape to the surface of the structural shape being laminated with conventional type compaction roller means, said head member further having a pair of operationally cooperating mechanisms to first strip the back layer from the composite tape while being fed to the structural shape surface and thereafter separate a predetermined length of the unbacked tape from the tape supply while still being continuously transported in the apparatus. Such backing removal mechanism includes means enabling separation of the backing layer from the moving tape while further continuously accumulating the removed backing layer. Said tape laying head member further includes mechanical cutter means which cooperate with pinch roller means enabling forward tape movement when being fed while preventing backward tape movement during tape separation with said cutter means. Conventional associated electrical control means in the present apparatus operates said head member in a preprogrammed sequential manner.

The present automated deposition method forms a composite laminated structural shape having at least one deposited surface layer of applied tape formed with continuous fibers selected from the group consisting of ceramics, metals, carbon, glass compositions and organic polymers which have been preimpregnated with a resin binder and backed with a releasable storage layer, such as paper, plastic and the like. Thermoset and thermoplastic prepregs of this type are already well known and commercially available including thermoset type prepregs having an uncured resinous matrix which are also suitable for deposition according to the present invention for later curing again by other well known customary means. The presently improved method for deposition of said fiber prepreg tape in the above defined apparatus comprises (a) first removing the backing layer from the tape being employed while being continuously transported by the tape laying member of said apparatus from a predetermined start position, (b) continuously moving the unbonded tape while being continuously fed to the structural shape receiving the applied tape employing pinch roller means incorporated in said tape laying member, (c) depositing a predetermined length of the moving unbacked tape on the top surface of said structural shape with compaction roller means, (d) severing the predetermined length of deposited tape from a tape supply with mechanical cutter means in the apparatus which cooperate operationally with said pinch roller means to permit forward movement of the tape being continuously fed while preventing backward tape movement during tape separation, and (e) returning the tape laying member in said apparatus to the next start position all with associated electrical control means. The herein defined method of operating the present apparatus understandably permits controlled movement of the movable tape laying head member in the present apparatus in various directions achieved with programmed software instruction. It follows therefrom that already known program controllers or software programmed computers can direct all lateral and vertical movement required to the tape laying member in the present apparatus. Accordingly, said automated control of the present apparatus can enable repetitive tape deposition from the same start position as well as depositing tape sequentially from different locations. Movement of the tape laying head during tape laydown can also be controlled with programmed instruction in still other respects. For example, such controlled movement of the head member along the length of already deposited tape enables the included compact roller means to exert a desired additional compressive action. Similarly, the operational speed at which movement of said included compaction roller means is controlled can be maintained no greater than the laydown speed of tape deposition. The present tape laying head still further includes a pair of operationally cooperating spools enabling the tape to be continuously supplied while continuously rewinding the removed backing layer.

In a representative embodiment, the tape laying member in the described apparatus contains all structural mechanisms required for deposition of a thermoset prepreg tape. A pair of rotating spools contained in said head member continuously supplies the tape being applied while also rewinding the backing layer being continuously removed from the supplied tape before its deposition. Motor driven pinch roller means in said head member feeds the tape being continuously transported to further include compaction roller means. Separation of the backing layer from the continuously moving tape in the illustrated head member occurs immediately after passage through said pinch roller means. A guillotine cutter mechanism in said head member finally severs the deposited tape and with all of said included mechanisms being operated as instructed with associated program controller means to be more fully described herein after. It is further contemplated in the present method to manually feed the tape being employed to the tape laying member before automated operation is initiated while also having the selected tape being manually trimmed before starting the automated operation. Similarly, it is contemplated that the present apparatus and method can also be used for end-product applications other than structural reinforcement such as fabrication of isogrid structures, fiber placement, filament winding and fiber preforms.

BRIEF DESCRIPTION OF THE DRAWINGS

FIG. 3 is a block diagram of representative programmed controller means to automatedly operate the FIG. 1 tape laying apparatus.

DETAILED DESCRIPTION OF THE PREFERRED EMBODIMENTS

Figure 1:
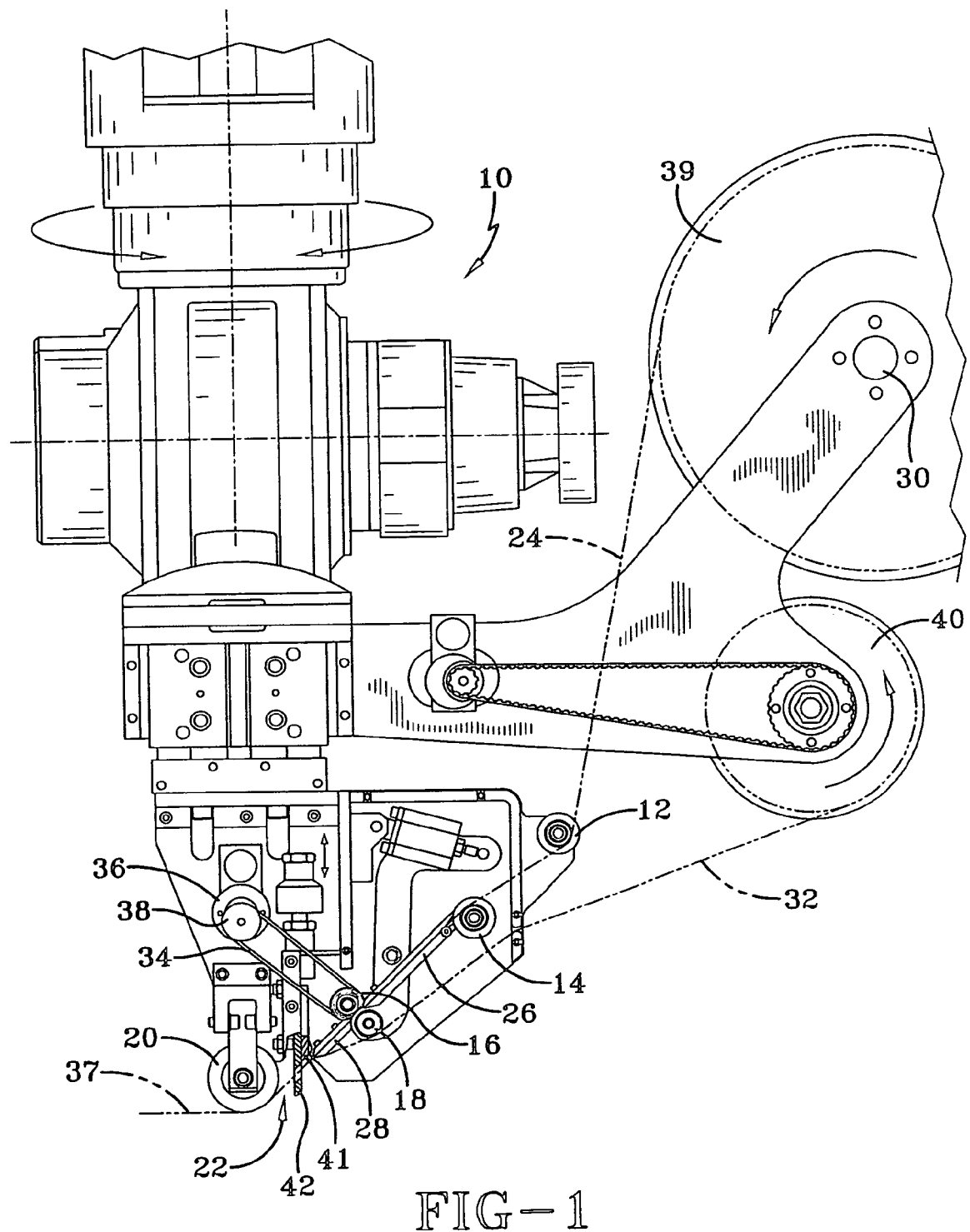
FIGS. 1 and 1A both depict a schematic side view for a representative tape laying apparatus according to the present invention.
Figure 1A:
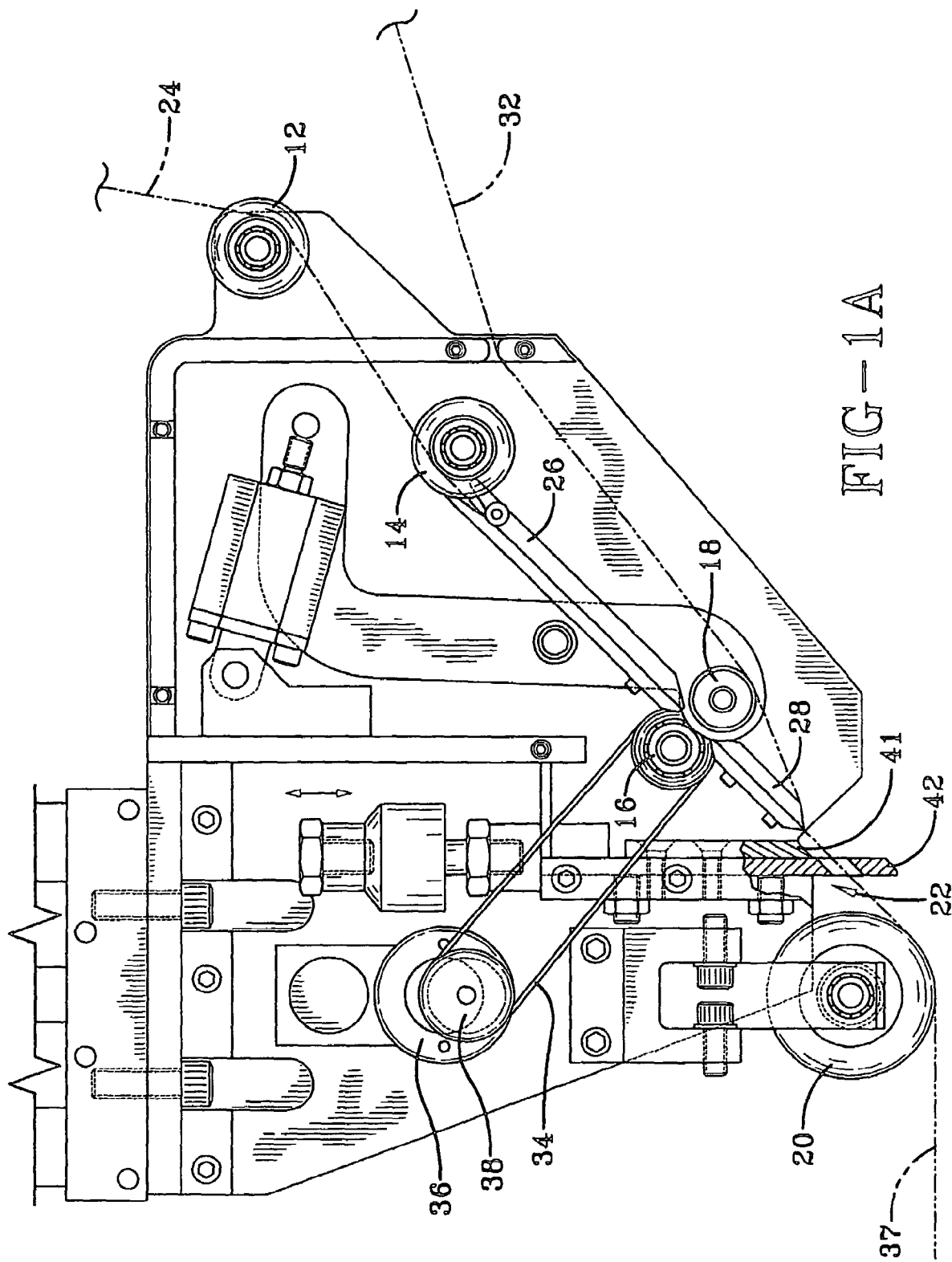

Referring to the drawings, there in shown in FIG. 1 a schematic side view of a typical tape laying apparatus according to the present invention. Basically, said movable tape laying member 10 houses a first pair of operationally cooperating guide or idler rollers 12 and 14, a second pair of operationally cooperating pinch rollers 16 and 18, a compaction roller 20 and a further included motorized guillotine cutter mechanism 22. As can be observed, the resin impregnated tape 24 being continuously transported in said tape laying member is guided during passage with suitably disposed chute guides 26 and 28. Rotating spool 39 supplies the tape being processed in said tape laying member and includes a conventional friction braking device 30 to avert tape unwinding when not being pulled forward by cooperating motor driven spool 40. Motor driven spool 40 continuously removes the backing layer 32 from the supplied tape by simply rewinding the separated backing layer about the spool circumference. Such backing layer removal from the moving tape occurs at the exit end of chute guide 28. Simply having the backing layer pulled away in a different direction by said motorized spool effects the desired separation. The unbacked tape next proceeds in a continuous manner while the tape laying member continues movement during tape deposition to said compaction roller 20. Compaction roller 20 in the tape laying member exerts a compressive force to the exiting tape by having physical contact with the top surface 37 of the structural shape being laminated as the tape is being deposited thereon. Cutter mechanism 22 employs paired stationary or rotating knife blades 41 and 42 having an open space therebetween for tape passage until being actuated to sever the tape material. Actuation of said cutter means can employ a conventional pneumatic cylinder (not shown) to enable blade movement when instructed by the fully automated electrical control means operating the present apparatus. Tape severance in said manner can proceed in a direction substantially perpendicular to the tape feed direction as well as in various bias directions. Under further instructions from said electrical control means, the described tape laying member is automatedly moved forward from an initial start position to deposit a predetermined length of tape and thereafter moved to a next start position for additional tape deposition. Said automated control procedure further enables substantially instantaneous restart of the present tape deposition procedure. FIG. 1A simply provides an enlarged view of the FIG. 1 apparatus.

Figure 2:
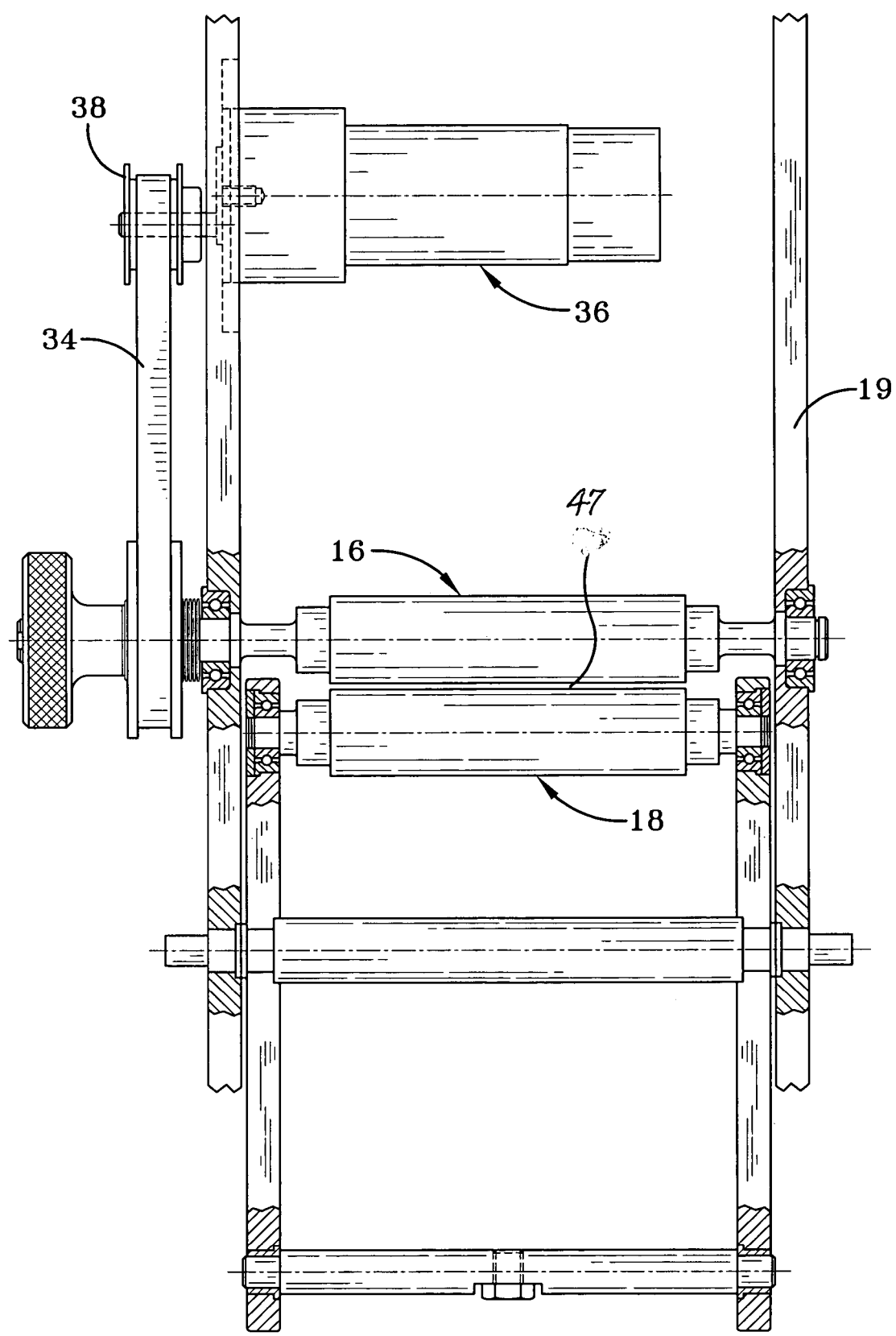
FIG. 2 is an end view depicting the motor driven pinch roller assembly in the FIG. 1 tape laying apparatus.

FIG. 2 is an expanded end view depicting the motor driven pinch roller means 16 and 18 employed in the previously described FIG. 1 tape laying apparatus. Top roller 16 is connected with a conventional flexible drive belt 34 to electric motor 36 further contained in said head member 10 to rotate said roller at a suitable rotational speed for transport of the tape being supplied thereto with assistance from the cooperating motor driven spool 40 operating in said head member. A conventional slip clutch mechanism 38 further connected to motor 36 provides the means for forward tape movement during tape transport while also preventing backward tape slippage. In said manner, the end of the tape being fed remains held between cooperating pinch rollers 16 and 18 after cutter mechanism 22 severs a predetermined length of the already applied tape. Roller 16 is motor driven to assist with automated tape transport in the present tape laying head member. When doing so, an open space 47 is maintained between rollers 16 and 18 for continuous tape passage therethrough until a pivot arm 19 connected to roller 18 is instructed by the associated electrical control means to bring both rollers into physical engagement. This roller engagement halts tape movement momentarily allowing the particular cutting means being employed to sever the unbacked tape length and with roller member 18 also being returned immediately thereafter to its open position by the employed automated control means for additional tape passage. Such fully automated procedure for cut and restart in the present head member understandably enables a more simple cutter mechanism being required. Actuation of said guillotine type cutter mechanism in the illustrated head member is further responsive to included program instructions contained in the overall electrical control means operating said head member. Said programmed instruction further controls movement of the illustrated head member during tape laydown. For example, the operational movement at which the illustrated head member is controlled can be maintained not to exceed the speed at which the backing layer in the resin impregnated tape is being removed. Movement of the illustrated head member can likewise be controlled for many other unrelated purposes. Thus, said head member can be programmed for subsequent movement along the length of already deposited tape to exert additional compressive action when desired.

There is depicted in FIG. 3 a block diagram illustrating a representative programmed controller means to operate the FIG. 1 tape laying apparatus. In such control system, a conventional program controller 44 or equivalent data processor is programmed to regulate motion and control of the FIG. 1 tape laying member. A first instruction program 43 is provided to said program controller for operation of all above described component mechanisms incorporated in the tape laying member 10 responsive to the given commands. A second instruction program 45 is similarly entered into the program controller 44 to determine the tape laydown pattern with movement of said head member 10. All movement and position commands for said head member are executed by said program controller 44 for head member operation in accordance with said commands. In doing so, said commands desirably include the geometric information needed to dictate the tape laydown path and tape length to a further conventional servo type analog/digital processor 46 receiving the program controller commands. The output signals from processor 46 thereby automatedly regulates operation of said tape laying head member 10 with respect to directed machine action including motion control, tape length control, cutter control, roller control and still other desirable functions such as head rotation and tape restart action.

It will be apparent from the foregoing description that a broadly useful apparatus and method has been provided to continuously apply composite fiber prepreg tape to form various laminated articles. It is contemplated that various modifications can be made in the present method and apparatus than herein specifically illustrated, however, without departing from the spirit and scope of the present invention. For example, it is contemplated that the present invention can be employed for any end product application requiring the positioning, cutting and deposition of a composite fiber prepreg tape, including tape impregnated with a thermoplastic resin binder. Such end product applications include but are not limited to the fabrication of isogrid structures, fiber placement, filament winding and fiber performs. Similarly, other already known digital and analog control means are contemplated to regulate tape laydown than herein illustrated. Accordingly, it is intended to limit the present invention only by the scope of the appended claims.

What we claim as new and desire to secure by Letters Patent is:

1. An automated cut and restart apparatus to form a composite laminated structural shape having multiple deposited surface layers of resin impregnated tape formed with continuous fibers selected from the group consisting of ceramics, metals, carbon, glass compositions and organic polymers which have been preimpregnated with a resin binder and provided with a releasable backing layer comprising:

(a) a laterally moving head member to continuously apply the resin impregnated tape to the surface of said structural shape with compaction roller means, said head member further having a pair of operationally cooperating mechanisms physically incorporated in said head member to first remove the backing layer from the applied tape while being continuously fed to the structural shape and thereafter sever a predetermined length of the unbacked tape from a tape supply while still being continuously fed from said head member, (b) said backing layer removal mechanism having means enabling separation of said backing layer from the tape while further continuously accumulating the removed backing layer in said head member, (c) said tape severing mechanism also physically incorporated in said head member including mechanical cutter means which cooperate with pinch roller means enabling forward tape movement when being fed while preventing backward tape movement during tape severance with said cutter means, and (d) associated electrical control means to operate said head member in an automated sequential manner.

2. The apparatus of claim 1 wherein said head member is automatedly moved forward from a start position to apply a first strip of resin impregnated tape to the structural shape then moved to a next start position for placement of another strip as directed by said associated electrical control means.

3. The apparatus of claim 1 wherein the head member is capable of receiving the resin impregnated tape before automated operation is initiated.

4. The apparatus of claim 3 wherein the head member is capable of receiving a trimmed resin impregnated tape.

5. The apparatus of claim 2 wherein the resin impregnated tape being employed is supplied from a spool incorporated in said head member.

6. The apparatus of claim 5 wherein the spool includes a friction braking mechanism.

7. The apparatus of claim 1 wherein the backing layer being removed is accumulates with a motorized spool incorporated in the head member.

8. The apparatus of claim 1 wherein the cutter means severs the predetermined layer of unbacked resin impregnated tape in a direction substantially perpendicular to the tape feed direction.

9. The apparatus of claim 7 wherein the cutter means severs the predetermined length of unbacked resin impregnated tape in a bias direction with respect to the tape feed direction.

10. The apparatus of claim 1 wherein the cutter means employs a knife blade.

11. The apparatus of claim 10 wherein the cutter means further includes a moving knife blade.

12. The apparatus of claim 11 wherein the cutter means employs a rotating disc knife blade.

13. The apparatus of claim 1 wherein the associated electrical control means includes a program controller.

14. The apparatus of claim 13 wherein the program controller comprises a software programmed computer.

* * * * *